Figure 1:
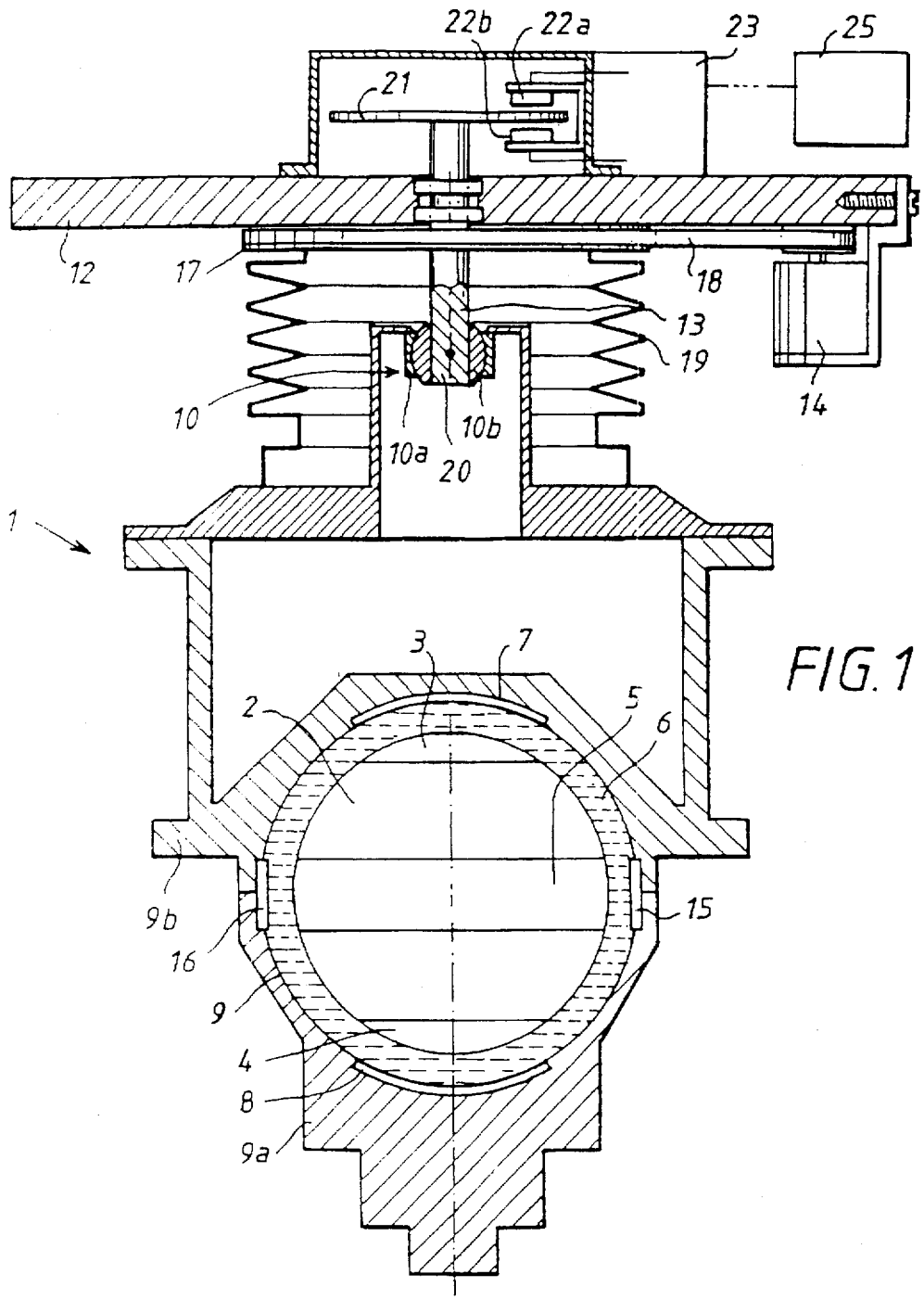

United States Patent

Hoffmann et al.

Patent Number: 5,752,412
Date of Patent: May 19, 1998

[54] PROCESS FOR SCANNING OF GYROSCOPIC INSTRUMENT AND A GYROSCOPIC INSTRUMENT USING THIS PROCESS

[75] Inventors: Heino Hoffmann, Kiel; Wolfgang Skerka, Rendsburg; Ulf Bey, Grossharrie, all of Germany

[73] Assignee: Raytheon Anschütz G.m.b.H., Germany

[21] Appl. No.: 893,317

[22] Filed: Jul. 16, 1997

Related U.S. Application Data

[63] Continuation-in-part of Ser. No. 505,104, Jul. 21, 1995, abandoned.

[30] Foreign Application Priority Data

Jul. 26, 1994 [DE] Germany .................. 44 26 293.0

[51] Int. Cl.$^6$ ...................................... G01C 19/28
[52] U.S. Cl. .................. 74/5.6 A; 74/5.6 R; 74/5.6 D
[58] Field of Search ............... 74/5.6 R, 5.6 D, 74/5.6 A, 5.6 E; 33/325, 326, 327, 301, 317 R

[56] References Cited

U.S. PATENT DOCUMENTS

| | | | |
|---|---|---|---|
| 2,200,431 | 5/1940 | Rateau | 74/5.6 A |
| 2,677,194 | 5/1954 | Bishop | 74/5.9 X |
| 2,959,060 | 11/1960 | Kunz | 74/5.6 A |
| 3,226,983 | 1/1966 | Boltinghouse et al. | 74/5.6 D |
| 3,258,976 | 7/1966 | Krupick et al. | 74/5.6 E X |
| 3,313,161 | 4/1967 | Nordsieck | 74/5.6 A |
| 3,373,616 | 3/1968 | Dugay | 74/5.6 A |
| 3,512,264 | 5/1970 | Ambrosini | 74/5.6 E X |
| 3,522,736 | 8/1970 | Hojo et al. | 74/5.6 D X |
| 3,531,997 | 10/1970 | Eddy et al. | 74/5.6 A |
| 3,967,384 | 7/1976 | Swartz et al. | 33/317 R X |
| 4,610,172 | 9/1986 | Mickle et al. | 74/5.6 A X |

*Primary Examiner*—Rodney H. Bonck
*Attorney, Agent, or Firm*—Shlesinger, Fitzsimmons & Shlesinger

[57] ABSTRACT

The invention refers to a process for scanning a gyroscopic instrument. The invention is characterised by the collection of gyroscopic data being effected by true angle scanning. In order to apply the process of the invention, a gyroscopic instrument including a gyroscopic scanning system is required in which the gyroscopic scanning system is coupled with a rotating, scanned and/or scanning unit. The process may also refer to a gyroscopic instrument including a gyroscopic scanning system in which a scanning module (such as a CCD sensor) is arranged on the side of the gyroscopic instrument as a scanning device, directly scanning horizontal and vertical true angle identifications on a gyroscopic instrument.

31 Claims, 4 Drawing Sheets

PROCESS FOR SCANNING OF GYROSCOPIC INSTRUMENT AND A GYROSCOPIC INSTRUMENT USING THIS PROCESS

This application is a continuation-in-part, of application Ser. No. 08/505,104, filed Jul. 21, 1995, now abandoned.

The invention refers to a process for scanning a gyroscopic instrument and a gyroscopic instrument using this process.

Gyroscopic instruments have been prior art for some time. A book entitled "Kreiselgeräte" (Gyroscopic Instruments) by Wolf von Fabeck, Vogel-Verlag W ürzburg, (1980), clearly describes the theoretical base and specific gyroscopic systems, in particular on pages 255–318.

A problem of gyroscopic instruments is the collection of data in the gyroscopic system. The standard design consists of a group of sensors and a rotating gyroscope scanned by means of a bridge circuit, with the scanning assembly tracking in agreement with the gyroscopic system in case of changes in course, for instance by a stepper motor. The angular value is generally transmitted to peripheral equipment with suitable means for course display and output. Appropriate gyroscopic instruments have been disclosed in DE-C 14 73 891 and DE-C 30 11 727.

It is the task of the invention to design a process for a gyroscopic instrument and a gyroscopic instrument operated by this process, allowing a scanning device to the effect digitalisation of gyroscopic data without an intervening gear which because of the looseness of its mounting can introduce inaccurate readings when the gear is located between the gyroscopic system and the scanning device.

This task is solved in accordance with the invention by a process for a gyroscopic instrument including coupling directly to a scanning device a portion of the instrument which surrounds and tracks the rotation of a north seeking sphere.

The process of the invention for scanning a gyroscopic instrument allows for the first time the collection of gyroscopic data directly by a true angle evaluation. This true angle evaluation may be performed electro-optically, electromagnetically or inductively. Data collected by true angle scanning will allow serial or parallel transmission to other equipment.

In order to ensure correct data transmission, any data transmitted should be checked back to the true angle evaluation unit of the gyroscopic instrument by the receiving devices in order to be re-output in case of errors until transmission is successful. Should this not be the case after a specific period of time, a signal will warn operators at the receiving unit, the gyroscopic instrument or elsewhere.

The receiving equipment, also called gyroscopic peripheral equipment, should allow analogue and/or digital data display.

For the gyroscopic instrument to be suitable for true angle evaluation, a scanning system must be provided to directly evaluate the motion of the gyroscopic instrument.

Such scanning may be directly performed at the gyro sphere of the gyroscope (the float), or the motion of the gyro sphere must allow scanning by a suitable system.

Such a system may be based, for instance, on the principle of a flexible shaft, directly transmitting the motion of the scanning assembly to a true angle encoded disc (for instance a Gray code). In this case, the reversing or changeover contacts are connected with each other by a bridge circuit tracked by a motor receiving its control signal from the bridge circuit.

Figure 2:
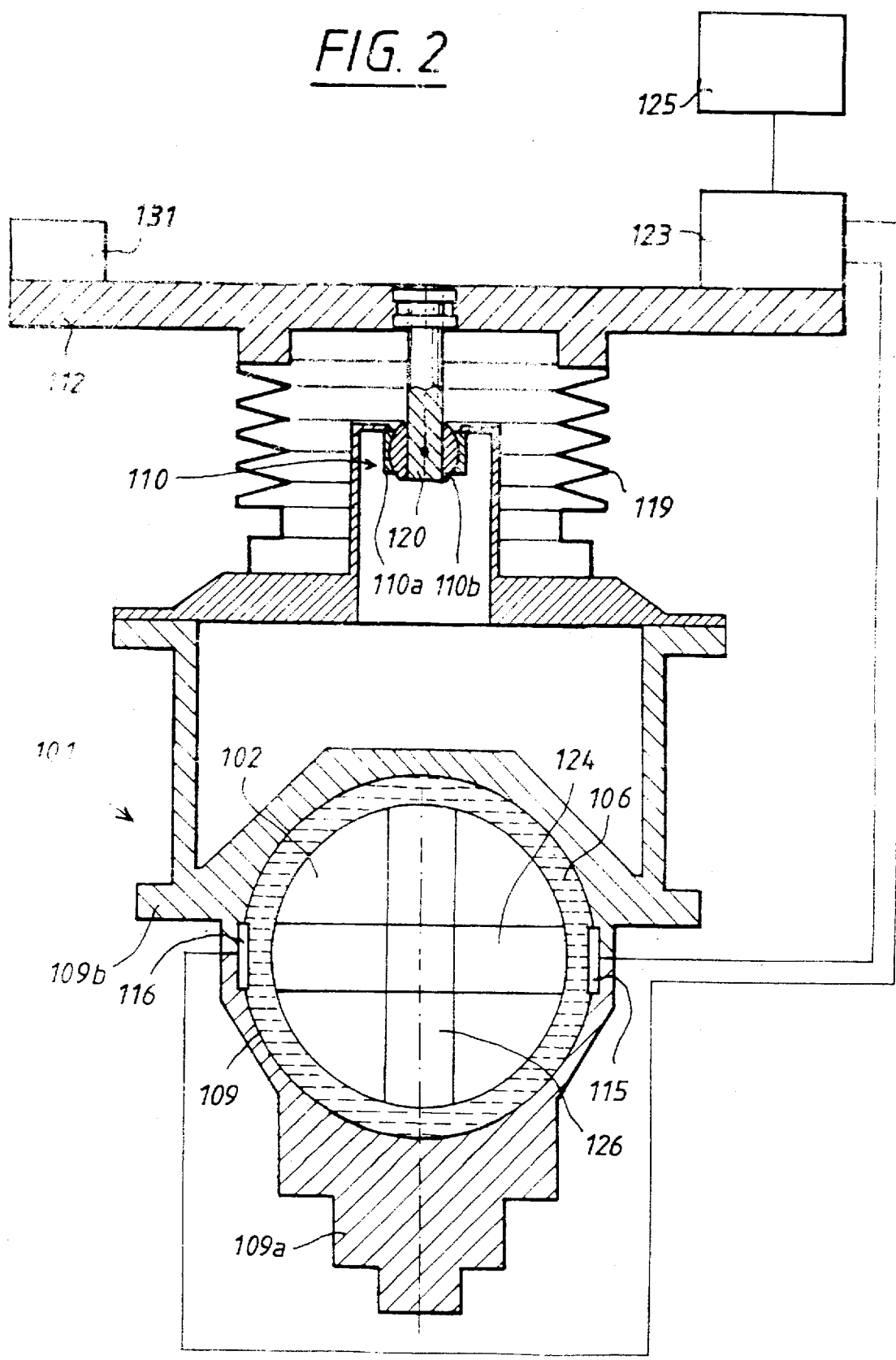

The other advantages and details of the invention will be disclosed hereafter by means of the enclosed and as described in FIGS. 1 and 2.

With

Figure 3:
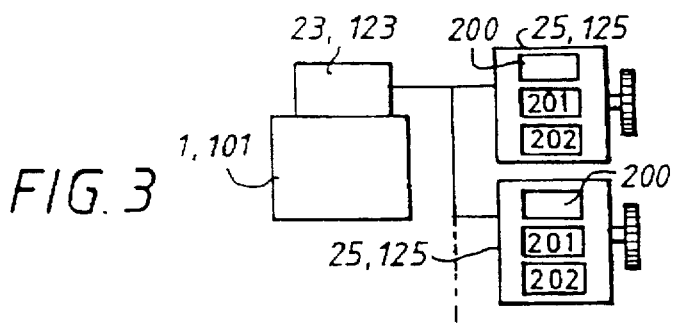

FIG. 1 showing a schematic diagram of a gyroscopic instrument in which the angle is not directly obtained from a gyro sphere;

FIG. 2 showing a schematic diagram of a gyroscopic instrument in which the angle is directly obtained from a gyro sphere (without tracking), and FIG. 3 showing a schematic diagram of a gyroscopic instrument and peripheral equipment.

Figure 4A:
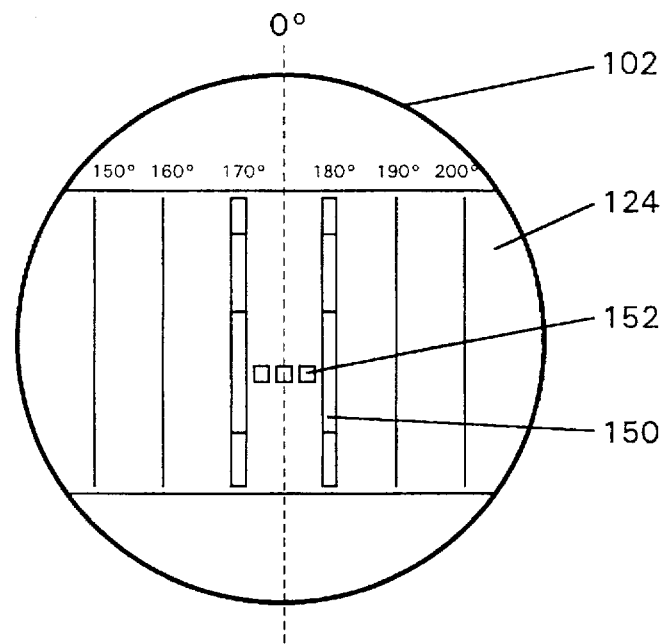
Figure 4B:
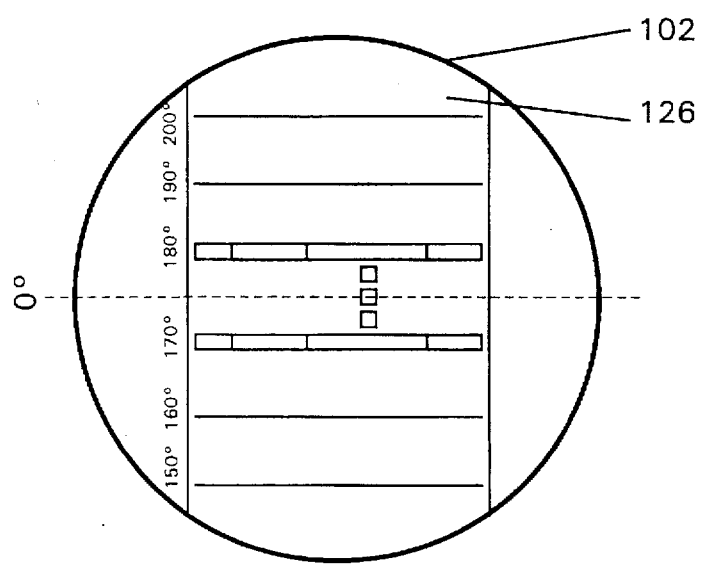
Figure 4C:
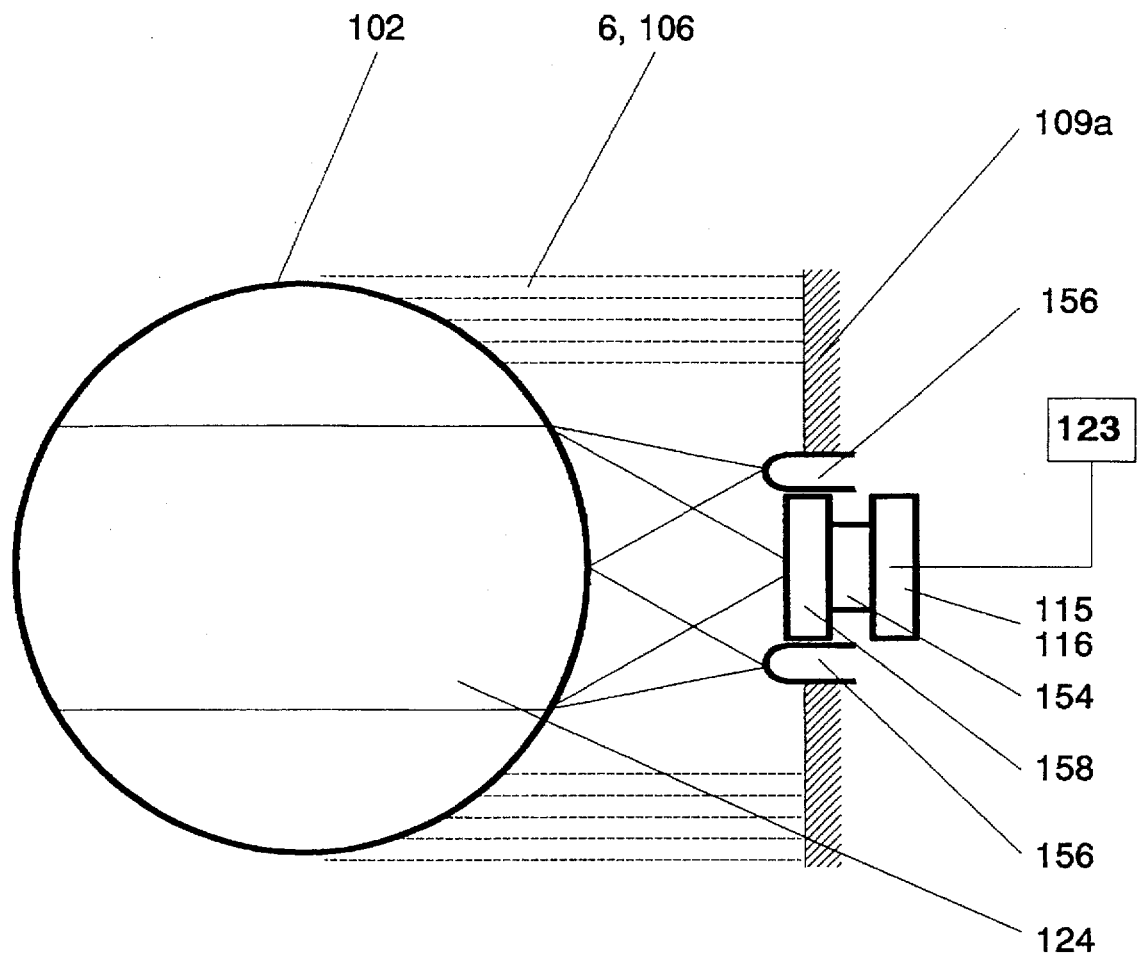

FIG. 4a illustrates diagrammatically and in greater detail the dial or scale 124 which is shown in FIG. 2 to be arranged horizontally around the periphery of float 102;

FIG. 4b illustrates diagrammatically in a greater detail the dial or scale 126 which is illustrated in FIG. 2 as being arranged vertically around the periphery of float 102; and FIG. 4c is a diagrammatically view of the float 102 illustrating diagrammatically the manner in which signals are transmitted between the float 102 and the sensor 115.

The gyroscopic instrument (1) shown in FIG. 1 is a compass in which the spherical float or north seeking element (2) includes a gyroscopic system pointing northward and two electrically driven gyroscopic rotors. In accordance with prior art, such as for example U.S. Pat. No. 3,373,617, this float (2) includes electrode faces (3, 4) at its poles and a conductive band (5) at its equator. It is floating in liquid electrolytes (6) by which the narrow gaps between the electrode faces (3, 4, 7, 8) arranged around the float are filled, with the latter electrode faces (7, 8) arranged on a hollow or phantom sphere or shell (9) surrounding the float (2). In the embodiment shown in FIG. 1, this phantom sphere (9) consists of a lower, approximately semi-spherical section (9a) and a top spherical capshaped section (9b) arranged on the same axis. Both sections (9a, 9b) of the phantom sphere (9) are fastened together to form on the inside a spherical enclosure filled with electrolytes (6). The complete assembly is pivoted around the vertical axle (13) and provided with an antiroll and antipitch ball-and-socket joint (10, 10a) (a pendulum joint).

The tracking moment is transmitted by torsion-proof, angular soft bellows (19). The current flowing through the electrode faces (3, 4) of the float (2) and the electrode faces (7, 8) of the phantom sphere (9) is controlling in a previously disclosed way a servomotor (14) arranged on a support (12), causing the phantom sphere (9) to track the float around its vertical axis, with the conductive band (5) being around the equator of float 2 scanned by the two changeover contacts (15, 16) and any signals produced thereby being compared in a bridge circuit (not shown in the Figure). Should a signal be emitted to the bridge circuit due to rotation of the float (2), the motor (14) will rotate the sphere 9, and hence the two changeover contacts (15, 16) within the phantom sphere (9) until the bridge circuit no longer provides a signal (corresponding to DE-C 1.473.891).

When a change in course occurs, the sphere-shaped float (2) is kept in position, with the changeover contacts (15, 16) forming part of a circuit tracking the motion of the float (2) by the motor (14), for instance by means of a gear unit (17, 18) including a V-belt (18) and a disc (17). These two changeover contacts (15, 16) are electrically connected with each other by the bridge circuit. When the output signal of the bridge circuit is zero, the electric motor (14) will stop. This motor (14) may be a stepper or a d.c. motor, transmitting the motion of the float (2) in relation to the phantom sphere (9) in this way. The phantom sphere (9) is directly connected to the drive disc (17) by elastic bellows (19). An axle (20) is protruding upwards from the centre of the drive disc (17), with a scanning disc (21) provided at the top of the extension tube. The scanning disc (21) (for instance a Gray code coding disc) is suitably scanned by elements 22a and 22b (i.e. electro-optically, inductively, capacitively).

A ball-and-socket joint (10) is arranged at the bottom end of the axle (20). This suspension and attachment of the phantom sphere assembly (9) including the changeover contacts (15, 16) is described in detail in DE-C 3011727, thus achieving a very high axial rigidity between the scanning disc (21) and the phantom sphere (9) which, however, counteracts any rotation and rolling motion of the phantom sphere (9) by a hardly noticeable (i.e. minimum) resistance.

The principle of scanning by a true angle encoder (21, 22a, 22b) (resolution $2^{12}$ to $2^{16}$) allows a true angle evaluation of the gyroscopic instrument (1) by electro-optical, electromagnetical, inductive, capacitive, etc. means. Signals include a true angle signal generated by the angle encoder (21, 22a, 22b) and transferable by means of an electrical unit (23) to gyroscopic peripheral equipment (25), for instance. This is shown in FIG. 3.

The gyroscope (1) shown in FIG. 1 based on azimuth evaluation (course angle determination) must at least include a suitable high-resolution true angle encoder (21, 22a, 22b) including a scanning disc (21) (preferably Gray code, electro-optical, electromagnetic, capacitive or inductive) (true angle measurements including appropriate dials on the scanning disc (21) have been well known from prior art) which is directly attached by a ball-and-socket joint (10, 10a, 10b) by its pivoting axle (13) (as disclosed in DE-C 30 11 727) as an antiroll and antipitch and/or antivibration device for vehicles, preferably a ship. Consequently the true angle is measured on the 360° axis of the gyroscopic system by directly flanging or connecting the encoder (21, 22a, 22b) to the tracking circuit as represented by contacts 15, 16. In other words, any rotation of sphere 9, and hence its contacts 15, 16 is imparted directly via bellows 19 and disc 17 to the encoder 21, 22a, 22b.

A non-contact gyroscopic system (2) centred in a liquid bearing means (6) (as disclosed in DE-PS 14 73 891) is directly coupled below the ball-and-socket joint (10, 10a, 10b). The gyroscopic system (2) is suitably scanned (changeover contacts, conductive band, bridge circuit, as disclosed in DE-PS 14 73 891), with the scanning assembly being tracked for instance by a stepper motor (14) in relation to the gyroscopic system in case of the vehicle changing its course.

This type of direct coupling of the angle sensor (21) with the scanning assembly and tracking circuit allows course determination, characterised in
  that transmission errors are eliminated, caused by gear units (non-gear, tooth pitch accuracy), allowing a considerable increase in evaluation accuracy;
  that a serial or parallel output signal is supplied which can be processed quickly and at low cost by the downstream digital electronic system and
  that it is true and clear (i.e. that error-free angle data are provided after mechanical adjustment and/or mains failure)

Peripheral equipment (25) (such as repeater compasses, an automatic control system, radar system, position receiver, etc.) will receive fail-safe signals thus not allowing desynchronisation. Course determination is effected clearly and truely without gear units, immediately supplying clear and angular information for instance after mains failure, mechanical adjustment or similar incidences. Peripheral equipment (25) is subject to serial or parallel control in a clear, true way.

In contrast to the embodiment shown in FIG. 1 of the idea of the invention, true angle data for the gyroscopic instrument (101) shown in FIG. 2 are directly applied to the float (102). For this purpose, the float (102) includes two dials (124, 126) arranged at an angle of 90° to each other, with preferably one dial (124) being arranged around the equator of the float (102). In this arrangement, scanning of the dials (124,126) may be performed preferably in a true way by means of CCD sensors (115, 116) which are similar in function to the switches 15, 16 of FIG. 1. and a suitable series-connected optical system.

For example, referring to FIG. 4a, the spacing between the individual dial or scale marks is, for example, 10° in the embodiment illustrated, for example, the spacing denoted between the two scale graduations 170° and 180°. In FIG. 4a a BCD (binary coded decimal) code 150 is shown to be located in the central zone, and a pixel code 152 is positioned between two scale marks. The BCD code is a tetradic code to represent the binary figures 0 to 9 with a place values 8-4-2-1. The broader straight lines illustrated in FIG. 4a carry the BCD code by means of which the coarse change in the course of an associated vehicle is detected. The pixel code of a higher resolution CCD element allows a higher or greater degree of resolution of course changes. In the foregoing example, of course, the vertical axis of the float 102 is assumed to be 0°, corresponding to the point from which the number of pixels of a line change in course is detected.

FIG. 4b illustrates the float 102 but in a position in which it is rotated 180° from the position as shown in FIG. 4a, and again illustrates the 10° space in between scale graduations. Although not illustrated in detail, it will be understood that, like dial or scale 124, the scale 126 also utilizes a BCD code and pixel code of the type described in connection with scale 124.

FIG. 4c illustrates diagrammatically how the float 102 floats in a liquid electrolyte (6,106), and how a holder 154 for the CCD sensor 115 or 116 (charge coupled device) mounted on the frame 109a. This comprises an integrated MOS circuit for the defined charged displacement below the surface of a semiconductor, via correspondingly arranged electrodes, which are insulated against the semiconductor, and a multi-phase clock pulse. In addition, a light emitting diode (LED) 156 is arranged on the holder 154 to direct beams toward the float 102. Centered in the LED is a lens, such as an objective lens 158, which is aligned with the dial or scale 124 on the float 102. The holder 154 with the LED 156, and objective lens 158, is connected with the suspension or cover 109a of the gyroscopic system.

In practice, the output signals of the laterally disposed CCD sensors 115 and 116, are sent in the form of angular signals which correspond to a predetermined rotation of the float 102, to a computer unit 123 in order to generate an output signal, which then conveys the absolute angle information to the peripheral devices 125.

The sensors (115, 116) will detect when the float (102) is rotating and output angle data calculated by means of the two signals. Should the sensors (115, 116) be distributed in horizontal and vertical direction over the circumference of the phantom sphere (109), tracking may be eliminated, with the signal provided being used by a computer unit (123) to generate an output signal transmitting true angle data to peripheral equipment (125). (All other components of the gyroscope are identical with the components described in FIG. 1, with numbers only being prefixed by one).

Transmission of true angle data, shown in FIG. 3 will be effected by a serial or parallel system. The peripheral equipment (25, 125) should check back any data received with the electronic transmission system (23, 123) (i.e. a computer unit) in order to ensure correct data transmission.

The peripheral equipment (25, 125) should allow the display of true angles by an analogue display (200) and a digital display (201) and/or electronic processing of other course determinations by a computer (202).

This type of data transmission will allow automatic adjustment of peripheral displays (i.e. of repeater compasses) (25, 125) even after mains failures and/or interruption of data transmission, with the peripheral equipment (25, 125) immediately receiving true angle data which may be used for automatic adjustment of an analogue display (201) in particular. Only when starting the system, the analogue display (201) must be adjusted to the value of the digital display (202). This may be effected manually or automatically, provided that the analogue display (201) provides a suitable scannable identification.

A special advantage of this system can be seen in the fact that the collection of true data on the 360° axis of a gyroscopic system (1, 101) is effected by direct flanging of the sensors (115, 116). This allows clear, true course determination without gear units, immediately providing clear angle data in case of mains failure, mechanical adjustment, etc.

Serial data transmission to peripheral equipment (25, 125) in particular offers the advantage that it can be clearly and truly controlled.

High-precision course angle determination is provided by a few components, with parallel or serial output signals being easily processed by a downstream digital electronic system (201, 202). The sensors (115, 116) designed in accordance with prior art are providing true angle data free from transmission errors due to direct scanning of the gyroscopic float.

In combination with an accelerometer (131) at the base (112) of the gyroscopic instrument, reading for instance three axes (x, y, z), the north-orientated, horizon-adjusted gyroscopic load allows additional horizontal angle data calculation (on 3 axles) and the outputs to peripheral equipment (25, 125).

We claim:

1. A process for scanning a gyroscopic instrument of the type having a gyroscopic system, which rotates angularly in response to the angular change in the course of an associated vehicle, thereby to produce a collection of gyroscopic data corresponding to the true angle of change in the vehicle's course, comprising
providing an electrical scanning device mounted for movement around said gyroscopic system to effect collection of said gyroscopic data, and
electrically coupling said scanning device to said gyroscopic system whereby rotation of said gyroscopic system is imparted to said scanning device.

2. A process for scanning a gyroscopic instrument in accordance with claim 1, including serially transmitting any data obtained by said device to other equipment.

3. A process for scanning a gyroscopic instrument in accordance with claim 1, including transmitting any data obtained by said device in parallel to other equipment.

4. A process for scanning a gyroscopic instrument in accordance with claim 3, causing the true angle scanning data transmitted to other equipment to be checked back to a true angle evaluation unit of the gyroscopic instrument for monitoring.

5. A process for scanning a gyroscopic instrument in acordance with claim 1, including determining the horizontal angle of the vehicle is determined.

6. A process for scanning a gyroscopic instrument in accordance with claim 1, including transmitting said gyroscopic data to peripheral gyroscopic equipment, and providing the peripheral gyroscopic equipment with a true analogue display of data transmitted.

7. A process for scanning a gyroscopic instrument in accordance with claim 1, including providing said gyroscopic system with a tracing circuit, and said scanning device with an encoder flanged to said tracing circuit.

8. A process for scanning a gyroscopic instrument in accordance with claim 1, including providing a true course reading based on a true angle encoder.

9. A gyroscopic instrument of the type having a gyroscopic system, which rotates angularly in response to the angular change in the course of an associated vehicle, and including a gyroscopic scanning system for determining the angular change in the course of the vehicle, and characterised in that the gyroscopic scanning system is directly coupled with a rotary scanning unit.

10. A gyroscopic instrument in accordance with claim 9, characterised in that the gyroscopic scanning system is suspended in a rotating joint and is adjustable in at least one circular socket in the joint.

11. A gyroscopic instrument in accordance with claim 9, characterised in that the gyroscopic scanning system is directly coupled by a unit, operating as a flexible connection, to the rotating scanning unit.

12. A gyroscopic instrument in accordance with claim 9, characterised in that a signal generating circuit is included in the gyroscopic scanning system.

13. A gyroscopic instrument in accordance with claim 9, characterised in that a drive unit is connected to the gyroscopic system to track the motion of the gyroscopic system.

14. A gyroscopic instrument in accordance with claim 9, characterised in that said scanning unit is attached to a scanned unit.

15. A gyroscopic instrument in accordance with claim 14, characterised in that at least one readable data track is arranged on the scanned unit for the scanning unit.

16. A gyroscopic instrument in accordance with claim 9, characterised in that the scanning unit generates signals that are digital angle data.

17. A gyroscopic instrument in accordance with claim 16, characterised in that any collected data are direct true angle data.

18. A gyroscopic instrument in accordance with claim 9, characterised in that the scanning unit is a true angle encoder.

19. A gyroscopic instrument in accordance with claim 9, characterised in that the gyroscopic instrument includes a ball-and-socket joint acting in a minimum of two directions on its rotating axle.

20. A gyroscopic instrument in accordance with claims 9, characterised in that below the ball-and-socket joint a non-contact gyroscopic system is supported in a liquid bearing means.

21. A gyroscopic instrument in accordance with claim 9, characterised in that the gyroscopic instrument is a gyroscope.

22. A gyroscopic instrument in accordance with claim 9, characterised in that a scanning assembly rotates in the gyroscopic system, with the scanning unit tracking the gyroscopic motion threreof.

23. A gyroscopic instrument in accordance with claim 22, characterised in that a true angle sensor is directly connected to the scanning assembly.

24. A gyroscopic instrument in accordance with claim 23, characterised in that the data of the true angle sensor are directly stored in a non-volatile RAM after scanning.

25. A gyroscopic instrument for detecting the angular change in the course of an asociated vehicle, comprising a rotatable gyroscopic device and a gyroscopic scanning system, characterized in that said scanning system includes a scanning component arranged on the gyroscopic instrument, said component being operative to scan directly horizontal and vertical markings on the gyroscopic device upon rotation thereof in response to any change in the angular course of said vehicle, and to generate a signal corresponding to said angular change.

26. A gyroscopic instrument in accordance with claim 25, characterized in that said markings on the gyroscopic device comprise two horizontal and vertical scales, respectively, which are arranged perpendicularly to each other and which are scanned by said scanning component which generates an absolute angle signal, which corresponds to a rotation of the gyroscopic device relative to the vehicle.

27. A gyroscopic instrument in accordance with claim 26, characterized in that the two scales which are perpendicular to each other are arranged on the periphery of a float which is surrounded by an electrolyte, and wherein the horizontal scale is disposed for preference on the equator of the float and in which the scanning component can also track the movement of the float.

28. A gyroscopic instrument in accordance with claim 27, wherein said scanning system includes a planar distribution of electrical sensors on the periphery of said float, whereby no tracking of the scanning component is necessary, and the signal which is obtained corresponding to the angular movement of the verhicle can be supplied directly to a computer and from it to peripheral devices.

29. A gyroscopic instrument in accordance with claim 27, characterized in that a LED lighting element is provided in order to illuminate the scales on the float, and means including a lens are provided to detect signals which are reflected from the scales corresponding to a movement of the float in two directions which are perpendicular to each other, and to transmit as data to a computer the values obtained from said signals, which correspond to the angular movement of the float.

30. A gyroscopic system in accordance with claim 25, characterized in that on the rotating gyroscopic device said markings form two information tracks which are perpendicular to each other, and said scanning system is arranged around the gyroscopic device, and said scanning component scans simultaneously or consecutively the two information tracks on the gryoscopic device, and the scanning component generates an absolute angle signal which corresponds to a rotation of the gyroscopic device with respect to the vehicle and which signal is disposed to be sent to a computer and from the latter to peripheral devices.

31. A gyroscopic instrument in accordance with claim 25, characterized in that a CCD sensor is used as the scanning component.

* * * * *